United States Patent [19]

Ryder, Jr.

[11] 4,381,985
[45] May 3, 1983

[54] MEMBRANE CONSTRUCTION
[75] Inventor: George A. Ryder, Jr., Seminole, Fla.
[73] Assignee: Innova, Inc., Clearwater, Fla.
[21] Appl. No.: 242,312
[22] Filed: Mar. 9, 1981
[51] Int. Cl.³ .................. C25B 13/02; C25B 13/04
[52] U.S. Cl. ..................... 204/296; 204/DIG. 13; 210/500.2
[58] Field of Search .................. 204/295–296, 204/151, DIG. 13, 275–276; 429/38–39, 42; 210/488, 500.2, 507, 508

[56] References Cited
U.S. PATENT DOCUMENTS

| | | | |
|---|---|---|---|
| 3,370,713 | 2/1968 | Stevens | 210/488 |
| 3,563,388 | 2/1971 | Briggs | 210/488 X |
| 3,607,706 | 9/1971 | Eisenmann | 204/296 |
| 3,648,843 | 3/1972 | Pearson | 210/488 X |
| 4,124,458 | 11/1978 | Moeglich | 204/296 X |
| 4,172,774 | 10/1979 | Moeglich | 204/296 X |
| 4,242,193 | 12/1980 | Moeglich | 204/296 |

Primary Examiner—Donald R. Valentine
Attorney, Agent, or Firm—Cushman, Darby & Cushman

[57] ABSTRACT

An ion transfer membrane assembly, for electrochemical processes, is provided which includes a plurality of layers of capillary material and a structure for compressing the layers together to control the water permeability of the membrane. The membrane includes a plurality of layers of capillary material, each of the plurality of layers being formed from a corrosion-resistant relatively soft, film, such as a thermoplastic film, having surface manifestations formed on it, which manifestations define the capillaries. The surface manifestation may be formed by embossing, frosting, etching, etc. A plurality of layers of corrosion-resistant, springy, porous capillary material, such as a polyester non-woven web, may be interspersed with the capillary material film layers, and a plurality of layers of smooth-surfaced film may also be interspersed with the capillary material film layers.

24 Claims, 4 Drawing Figures

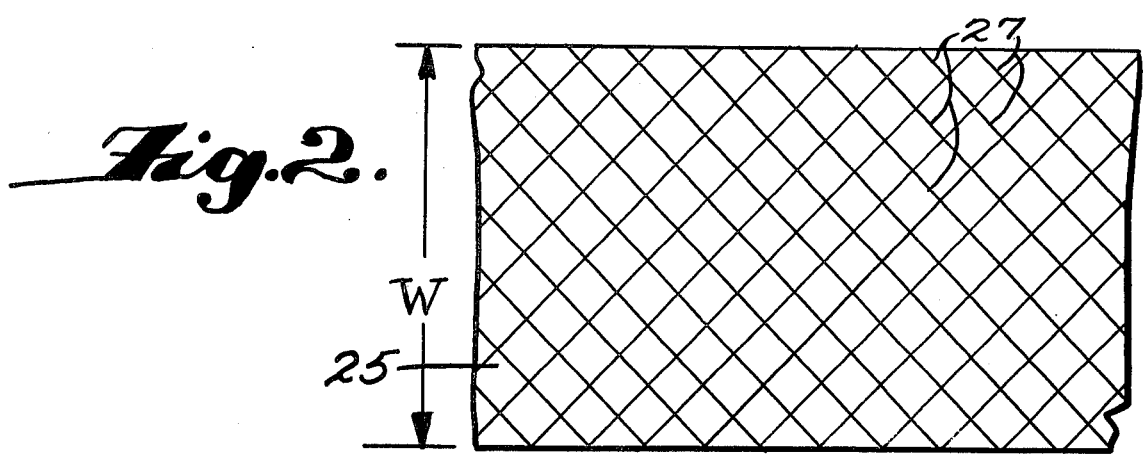
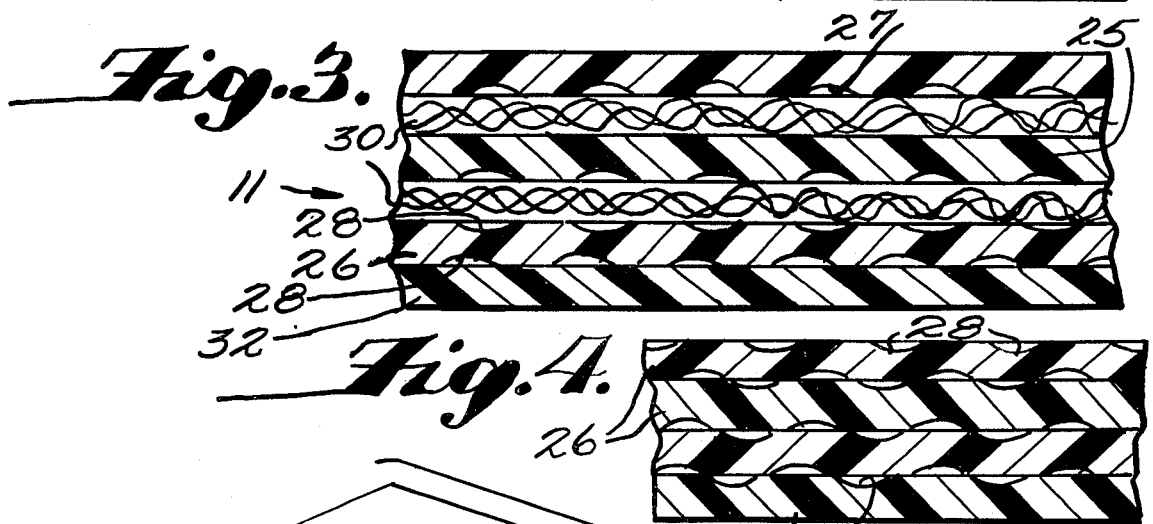
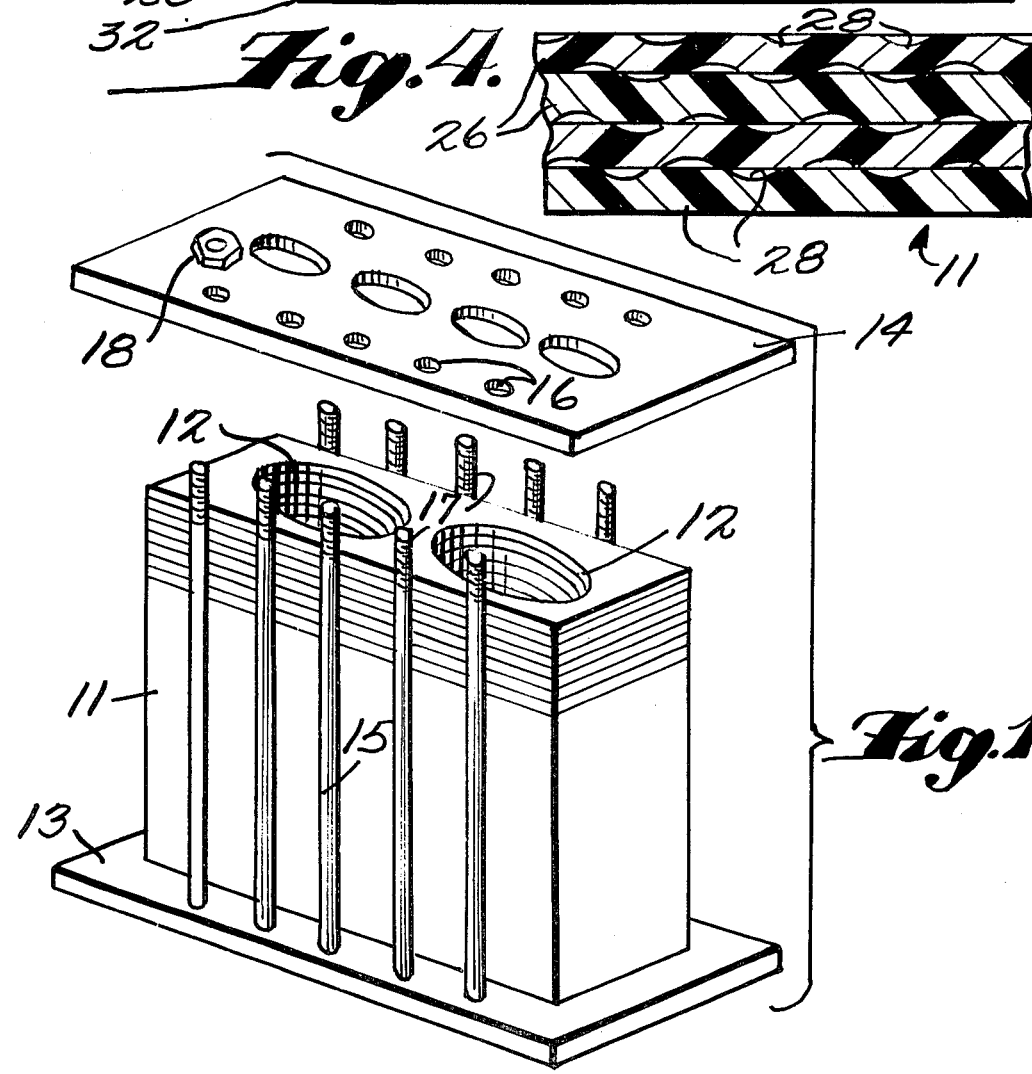

MEMBRANE CONSTRUCTION

BACKGROUND AND SUMMARY OF THE INVENTION

The present invention relates to an ion transfer membrane assembly for electrochemical processes, and a method of construction thereof, and an electrochemical cell utilizing the membrane assembly. The membrane assembly is of the same general type illustrated and described in U.S. Pat. No. 4,242,193, including a plurality of layers of capillary material. Like the membrane in said patent 4,242,193, the membrane according to the present invention comprises a metal anion permeable, non-ionic, semi-permeable, non-permselective membrane, having no membrane potential and capable of providing passage of anions thereacross over extended operation without destructive swelling, clogging, chemical reaction, or consumption thereof.

While the membrane disclosed in U.S. Pat. No. 4,242,193 has been found eminently suitable for a wide variety of chemical processes, where the gradient of concentration is high, the membrane disclosed in U.S. Pat. No. 4,242,193 has some limitations. These limitations are overcome according to the present invention, the present membrane being capable of utilization even where the gradient of concentration is extremely high.

According to the present invention, an improved (for many applications) type of capillary material is utilized in a membrane construction generally like that in U.S. Pat. No. 4,242,193. In said patent, the types of capillary materials specifically disclosed were porous materials having natural capillarity, such as paper, polyester non-woven webs, etc. The pore size in such natural capillary materials are not completely controllable, however, and it has been found according to the present invention that where a capillary material is utilized that has very precisely controllable capillary size, it is possible to construct a membrane that is utilizable even where the gradient of concentration is extremely high.

A membrane assembly according to the present invention provides capillaries of controlled size by providing as a membrane a plurality of layers of capillary material each being formed from a corrosion-resistant, relatively soft, film having surface manifestations formed thereon defining capillaries extending from one side thereof across the width thereof to the other side thereof. Thermoplastic films, such as polyvinyl chloride, polyethylene, polyester, polypropylene, and polyurethane films, are particularly suited for a membrane construction, and the film may be embossed, frosted, etched, scribed, or formed with a lumpy surface to provide the necessary surface manifestations. The layers are compressed together with a compression means to control the water permeability of the membrane and to maintain its structural integrity.

The layers of thermoplastic film capillary material may be interspersed with layers of other types of material. For instance, a plurality of layers of corrosion-resistant, springy, porous capillary material, such as webs of woven or non-woven synthetic fiber fabric (e.g., polyester non-woven webs) may be interspersed with the capillary material film layers, and/or a plurality of layers of smooth-surfaced film may be interspersed with a capillary material film layers. While in many environments a composite membrane of a variety of layers of different types of material is desirable, in some environments the membrane consists of said plurality of capillary material film layers, adjacent film layers having non-interlocking surface manifestations.

In its broadest aspect, the method of construction of an ion transfer membrane assembly for electrochemical processes is produced by forming a plurality of capillary-like manifestations in a normally non-capillary material, and assembling the non-capillary material with capillary-like manifestations into a membrane having a desired water permeability, with capillaries extending from one side of the membrane to the other. According to the preferred manner of practicing the present invention, the capillary-like manifestations in a non-capillary material are created by forming a plurality of sheets of thermoplastic film with surface manifestations (as by embossing, frosting, etching, etc.), the surface manifestations extending across the width thereof. The sheets are then stacked and a compressive force is applied to them to control the water permeability. Again, interspersed with the capillary material films may be layers of corrosion-resistant, springy, porous capillary material and/or layers of smooth-surfaced film. By precisely controlling the formation (size, pattern, etc.) of the capillaries associated with the normally non-capillary material, and by precisely controlling the compressive force applied to the membrane, an ion transfer membrane having virtually any desired water permeability may be formed.

An electrochemical cell constructed according to the present invention includes an anode disposed in an anode chamber, a cathode disposed in a cathode chamber, and a membrane assembly disposed between the anode and cathode chambers. The membrane assembly comprises a metal anion permeable, non-ionic, semi-permeable, non-permselective membrane having no membrane potential and capable of providing passage of anions across over extended operation (i.e., hundred of hours if not years) without destructive swelling, clogging, chemical reaction, or consumption thereof. The membrane comprises a non-capillary material with controlled capillaries introduced therein and extending from the anode chamber to the cathode chamber. Preferably, the membrane comprises a plurality of layers of thermoplastic film having surface manifestations formed thereon which define the capillaries.

It is the primary object of the present invention to provide an ion transfer membrane having precisely controlled capillaries extending thereacross, and capable of operating effectively with extremely high gradients of concentration. This and other objects of the present invention will become clear from an inspection of the detailed description of the invention, and from the appended claims.

BRIEF DESCRIPTION OF THE DRAWINGS

FIG. 1 is an exploded perspective view of an exemplary membrane assembly according to the present invention;

FIG. 2 is a top plan view of an exemplary embossed thermoplastic film utilized as capillary material in the assembly of FIG. 1;

FIG. 3 is a partial cross-sectional view of an exemplary embodiment of the membrane of FIG. 1; and FIG. 4 is another partial cross-sectional view of another exemplary embodiment of the membrane of FIG. 1.

DETAILED DESCRIPTION OF THE DRAWINGS

In FIG. 1, an exemplary ion transfer membrane assembly according to the present invention is illustrated. The membrane assembly illustrated in FIG. 1 is particularly adapted for use in the purification of chromium plating rinse water, such as described in copending application Ser. No. 241,424 filed Mar. 6, 1981, entitled "Apparatus and Method for Treating Chromium Plating Rinse Water and the Like", the disclosure of which is hereby incorporated by reference herein. In the embodiment illustrated, the membrane assembly includes a membrane 11 which comprises a block of membrane material, with means defining at least one opening 12 therein, extending the length of the height of the block 11. In use, the volume surrounding the block 11 comprises one electrode chamber (e.g., cathode chamber) while the volume within the opening(s) 12 comprises the electrode chamber for the other electrode (e.g., anode).

Means are provided for compressing the membrane 11 to control the water permeability thereof. In the embodiment illustrated, the compression means includes a bottom plate 13, top plate 14, and a plurality of compression rods 15 which extend through openings 16 in the top plate 14, are attached to the bottom plate 13, and have threaded ends 17 which engage nuts 18 on the opposite side of plate 14 as the plate 13, the nuts 18 tightening the plate 14 in place. The compressive force applied by the plates 13, 14 may be adjusted depending upon the particular situation—e.g., the concentration gradient, membrane materials, catholyte, etc.

The embodiment illustrated in FIG. 1 is merely one of many configurations that the membrane 11 may take. For instance, the membrane may have no opening 12 formed therein, and may be merely disposed between, and separate, anode and cathode chambers, or may be of curvilinear or cylindrical construction, etc. Several exemplary geometric configurations that the membrane 11 can assume are illustrated in said Pat. No. 4,242,193.

According to the present invention, the membrane 11 is constructed, at least in part, of material that is not normally capillary material, but rather has been specifically treated to have capillaries of predetermined properties (e.g., size and configuration) associated therewith, extending from the cathode chamber to the anode chamber (i.e., across the width of the membrane 11). This is preferably accomplished according to the present invention by providing a plurality of layers of capillary material defining the membrane 11, as illustrated in FIG. 1, each of said plurality of capillary material layers being formed from a corrosion-resistant, relatively soft, normally non-capillary material film, the film having surface manifestations formed thereon defining the capillaries. Preferably the film is a thermoplastic film, such as films 25 and 26 illustrated in FIGS. 2 through 4, preferred materials for the films 25, 26 being polyvinyl chloride, polyethylene, polyester, polypropylene, and polyurethane. The film need not be completely continuous, but rather may be apertured.

FIG. 2 illustrates one form that the surface manifestations 27 on the film 25 may take. In FIG. 2, the surface manifestations 27 comprise embossments formed on the surface of the film 25. The embossments may be formed in a regular or irregular pattern, as long as capillary channels which are defined by the surface manifestations define a path extending the width W of the film layer 25. The surface manifestations may be formed in a wide variety of other ways depending upon the particular uses, cell parameters, etc. For instance, the film may comprise a film with irregular lumps, a frosted film, an etched film, a scribed film, etc.

The films 25 illustrated in FIGS. 2 and 3 have surface manifestations 27 formed on only one surface thereof, while films 26 have surface manifestation 28 formed on both surfaces thereof. Whether one or both surfaces of a film are provided with surface manifestations, or whether the entire film itself is distorted to provide continuous surface manifestations on both sides, will depend upon the particular cell parameters, uses, etc.

The films 25, 26 preferably are thin so that the amount of effective area thereof is great. Good results are obtainable using films having a thickness of about 1–10 mils, with a preferred range of film thickness of 3–5 mils. The size of the capillaries formed by the film (e.g., embossed surface manifestations 27) will vary depending upon particular circumstances. Where the membrane assembly illustrated in FIG. 1 is to be utilized in a chromium plating rinse water treatment system, the average capillary size formed by the embossments 27 would be about one-thousandth of an inch in diameter (i.e., an average cross-sectional dimension of about 0.0000008 sq. in.). The membrane 11 is constructed, and the compressive force applied by the plates 13, 14 is designed, so that the water permeability of the membrane 11 is ideally in the range of 0.02–2.0 ml./min.-in$^2$ at 5.5 in. water. Where the membrane assembly illustrated in FIG. 1 is used in a chromium rinse water treating system, water permeability preferably would be 0.07. Water permeability, like many other factors associated with the membrane assembly according to the present invention, is variable depending upon cell parameters, use, etc.

In many situations, it is desirable to construct the membrane 11 so that it is fairly stable, and does not respond quickly to new equilibrium conditions. Such stability may be introduced into the membrane 11 by providing the membrane 11 with a plurality of layers of corrosion-resistant, springy, porous capillary material interspersed with the film layers 25, 26. Such layers of porous capillary material are illustrated by reference numerals 30 in FIG. 3, and may be provided so that they alternate with the film layers 25, 26. Typical porous capillary material layers are the type of natural capillary material layers enumerated in said U.S. Pat. No. 4,242,193. Particularly useful are woven and non-woven synthetic fiber fabric webs, such as thermally bonded polyester fabric webs. As the membrane expands and contracts as a result of temperature change or some swelling or corrosion, there must be a springy capability of the membrane materials to take up the expansion or contraction. The porous capillary material layers 30 are ideal for this, as well as providing a relatively large volume in which liquid carrying ions transported across the membrane 11 may reside, providing the desired stability. However, depending upon the selection of the film 25, 26 materials, the layers 30 may not be necessary for the expansion-contraction taking-up function.

FIG. 4 illustrates a membrane consisting essentially of film layers 26 with surface manifestations 28, no other materials being provided. Where the film material making up the layers 26 is flexible, resilient, and is truly non-swelling and non-corrosive (for instance, polyvinyl chloride in some cell environments), the film layers 26 may merely be stacked one upon the other as long as the surface manifestations 28 thereof are non-interlocking.

Other materials may be utilized in the membrane 11 too, if desired. For instance, sometimes it is desirable to define capillary channels with a film layer 25, 26 having surface manifestations 27, 28 in conjunction with a smooth-surfaced thermoplastic film layer, such as the layer 32 illustrated in FIG. 3. In fact, the layers 25, 26, 30, and 32 all may be interspersed as desired depending upon requirements.

An electrochemical cell produced according to the teachings of the invention has an anode disposed in an anode chamber, and a cathode disposed in a cathode chamber, with the chambers separated by a membrane that is a metal anion permeable, non-ionic, semi-permeable, non-permselective membrane, having no membrane potential and capable of providing passage of anions thereacross over extended operation (i.e., hundreds of hours if not years) without destructive swelling, clogging, chemical reaction or consumption thereof. The membrane comprises a non-capillary material with controlled capillaries introduced therein and extending from the anode chamber to the cathode chamber, as the illustrated membrane 11. This cell will function well over extended periods of time even with an extremely high gradient of concentration. The following example illustrates the advantageous results achievable utilizing a membrane according to the present invention:

An electrochemical cell was provided with an anode compartment volume of 3.4 liters, and a cathode compartment volume of 300 liters, with the membrane separating the anode and cathode compartments. The effective membrane surface area was 400 sq. in, and the thickness of the membrane itself was one-half inch, with a weight of 3,725 grams. The membrane was comprised of two materials. Some of the membrane layers were a four-mil polyethylene film with a melt index of 4.0 with a light embossment (0.0005 inch deep) produced in the film by rolling the film material when warm over a pressure embossing steel roll. The pattern design was square tufts of 0.025 inch in size. The second membrane material was non-woven thermally bonded polyester fabric 3 mils thick. Alternating layers of embossed polyethylene film and polyester cloth were provided to create a membrane stack of 12 inches, and a compression force of about 80 psi was provided by plates on top and bottom of the membrane stack, drawn toward each other by compression rods.

During the test, conditions simulating a chromium plating rinse water treatment situation were provided. At the start of the test, chromic acid of 30,000 mg/l hexavalent chromium was provided in the anode compartment and 150 mg/l hexavalent chromium solution was placed in the cathode compartment. A voltage of 25 volts DC was applied across the cell electrodes. The chromium concentration (in mg/l) in the cathode compartment was measured after 24 hours and found to be 3.0, and when measured after 48 hours was found to be 0.3. Thus the membrane 11 performed very well even with an extremely high gradient of concentration.

The performance of a membrane as described above is truly unexpected. For instance, following the literal teachings of the prior art as exemplified by U.S. Pat. No. 4,242,193 and providing a membrane constructed in exactly the same manner as the membrane described in the above example, only where the polyethylene film had a smooth surface instead of a light embossment, the following results were obtained when the hexavalent chromium concentration (mg/l) in the cathode compartment was measured: After 24 hours, 80; after 48 hours, 83. Thus, while the prior art cell did initially function to reduce the chromium concentration (from 150 to 80) it was unable to continue functioning to move hexavalent chromium from the cathode compartment to the anode compartment.

An exemplary membrane assembly according to the present invention having been described, exemplary methods of construction thereof will now be set forth:

According to the broadest aspects of the present invention, a method of constructing an ion transfer membrane assembly for electrochemical processes is provided, the method comprising the steps of: (a) forming a plurality of capillary-like manifestations in a non-capillary material; and (b) assembling the non-capillary material with capillary-like manifestations into a membrane having a desired water permeability (e.g., 0.02–2.0ml./min.-in.$^2$ at 5.5 in. water), with the capillaries extending from one side thereof to the other. Step (a) is preferably practiced by forming a plurality of sheets of thermoplastic film with surface manifestations formed thereon extending across the width thereof. Step (b) is preferably accomplished by stacking the sheets and applying a compressive force to the stack to control the water permeability thereof.

According to another aspect of the method of the present invention, a method of constructing an ion transfer membrane assembly for electrochemical processes comprises the following steps: (a) Forming a thermoplastic film with surface manifestations defining capillaries. (b) Cutting the film into regularly-sized sheets, in each sheet there being capillaries extending from one side thereof across the width thereof to the other side thereof. (c) Disposing the sheets in a stack; and (d) applying a compressive force on the stack to control the water permeability. Steps (a) may be accomplished by embossing thermoplastic film, or in many other manners. The method comprises the further step of cutting a web of corrosion-resistant, springy, porous capillary material (such as a non-woven thermally bonded polyester fabric) into sheets having the same length and width as the film sheets; and step (c) may be practiced by interspersing the porous capillary sheets with the film sheets in the stack.

It will thus be seen that according to the present invention a membrane assembly, an electrochemical cell utilizing the membrane assembly, and a method of construction of the membrane assembly, have been provided which effect proper, effective, ion transfer over long periods of time even where the gradient of concentration is extremely high; and do so in a simple manner.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A membrane assembly for electrochemical processes, comprising:

a membrane defined by a stack of corrosion-resistant, water impervious, electrically non-conductive, relatively soft, normally non-capillary material film layers, the stack having a length, width, and height;

surface manifestations formed on said film layers defining capillaries extending continuously from one side of said stack, across the width thereof, to the other side of said stack; and means for compressing said layers together to control the water permeability of the membrane.

2. An assembly as recited in claim 1 wherein said film comprises an embossed film.

3. An assembly as recited in claim 1 wherein said film comprises a lumpy-surface film.

4. An assembly as recited in claim 1 wherein said film comprises a frosted film.

5. An assembly as recited in claim 1 wherein said film comprises an etched film.

6. An assembly as recited in claim 1 wherein said film comprises a scribed film.

7. An assembly as recited in claim 1 wherein said film is of a material selected from the group consisting essentially of polyvinyl chloride, polyester, polyethylene, polypropylene, and polyurethane.

8. An assembly as recited in claim 7 wherein said film is about 1-10 mils thick.

9. An assembly as recited in claim 7 wherein said film is about 3-5 mils thick.

10. An assembly as recited in claim 1 further comprising a plurality of layers of corrosion-resistant, springy, porous capillary material interspersed with said film layers.

11. An assembly as recited in claim 1 having a water permeability of about 0.02-2.0 milliliters per minute per square inch at a pressure of 5.5 inches of water.

12. An assembly as recited in claim 1 having capillaries of an average cross-sectional dimension of about 0.0000008 sq. in.

13. An assembly as recited in claim 1 wherein said membrane assembly comprises a block of membrane material and means defining at least one opening in said membrane material extending the length of the height of said block.

14. An assembly as recited in claim 1 wherein said membrane consists of said plurality of said film layers, adjacent film layers having non-interlocking surface manifestations.

15. An assembly as recited in claim 14 wherein said film is of polyvinyl chloride.

16. An assembly as recited in claims 1, 2, 3, 4, 5 or 6 wherein said film is thermoplastic.

17. A membrane assembly for electrochemical processes, comprising: a membrane defined by a stack of corrosion-resistant, relatively soft, normally non-capillary material film layers, the stack having a length, width, and height;

surface manifestations formed on said film layers defining capillaries extending continuously from one side of said stack across the width thereof, to the other side of said stack;

means for compressing said layers together to control the water permeability of the membrane; and a plurality of layers of corrosion-resistant, springy, porous capillary material interspersed with said film layers.

18. An assembly as recited in claims 10, or 17 wherein said film and porous capillary material layers alternate.

19. An assembly as recited in claims 10, or 17 wherein said porous capillary material is selected from the group consisting essentially of woven and non-woven synthetic fiber fabric webs.

20. An assembly as recited in claims 1, 17 or 10 further comprising a plurality of layers of smooth-surfaced non-capillary material film interspersed with said capillary material film layers.

21. An assembly as recited in claim 20 wherein said films are thermoplastic films.

22. A membrane assembly for electrochemical processes comprising:

a membrane defined by a stack of thermoplastic film layers, the stack having a length, width, and height;

surface manifestations formed on said thermoplastic film layers defining capillaries extending continuously from one side of said stack, across the width thereof, to the other side of said stack; and means for compressing said layers together to control the water permeability of the membrane.

23. A structure as recited in claims 1 or 22 further comprising means for stabilizing the membrane so that it does not quickly respond to new equilibrium conditions.

24. A membrane assembly for electrochemical processes comprising:

a membrane defined by a stack of corrosion-resistant, relatively soft, normally non-capillary material film layers, the stack having a length, width, and height;

surface manifestations formed on said film layers defining capillaries extending continuously from one side of said stack, across the width thereof, to the other side of said stack, said capillaries having an average cross-sectional dimension of about 0.0000008 square inches; and means for compressing said layers together to control the water permeability of the membrane.

* * * * *